United States Patent
Gudipati et al.

(10) Patent No.: US 12,430,338 B2
(45) Date of Patent: Sep. 30, 2025

(54) DETECTION OF TARGET DATA IN DATABASES

(71) Applicant: Rubrik, Inc., Palo Alto, CA (US)

(72) Inventors: Srilekha Gudipati, Raleigh, NC (US);
Prasenjit Sarkar, Los Gatos, CA (US);
Deepti Kochar, San Mateo, CA (US);
Kaustubh Raval, Sunnyvale, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/486,822

(22) Filed: Oct. 13, 2023

(65) Prior Publication Data
US 2025/0124036 A1    Apr. 17, 2025

(51) Int. Cl.
*G06F 16/00* (2019.01)
*G06F 16/22* (2019.01)
*G06F 16/2455* (2019.01)

(52) U.S. Cl.
CPC ...... *G06F 16/24553* (2019.01); *G06F 16/221* (2019.01)

(58) Field of Classification Search
None
See application file for complete search history.

(56) References Cited

U.S. PATENT DOCUMENTS

| | | | | |
|---|---|---|---|---|
| 2005/0235004 A1* | 10/2005 | Folkert | ............... | G06F 16/2393 |
| 2013/0226940 A1* | 8/2013 | Gorelik | ................. | G06F 16/211 |
| | | | | 707/754 |
| 2023/0306003 A1* | 9/2023 | Jain | ....................... | G06F 16/254 |

* cited by examiner

*Primary Examiner* — Anhtai V Tran
(74) *Attorney, Agent, or Firm* — Holland & Hart LLP

(57) ABSTRACT

Methods, systems, and devices for data management are described. The method may include obtaining first subsamples of a data table, where the first subsamples include information from a first quantity of columns of the data table. The method may also include processing the first subsamples of the data table to identify whether the information included in the first subsamples includes a target type of information. The method may include obtaining a second subsample of the data table, where the second subsample includes information from a subset of columns of the first quantity of columns. The method may include processing the second subsample of the data table to identify whether information included in the subset comprises the target type of information and identifying, based at least in part on processing the one or more first subsamples and the second subsample, one or more locations of the target type of information within the data table.

19 Claims, 10 Drawing Sheets

DETECTION OF TARGET DATA IN DATABASES

FIELD OF TECHNOLOGY

The present disclosure relates generally to data management, including techniques for detection of target data in databases.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of one or more computing systems. Improved data management may offer improved performance with respect to reliability, speed, efficiency, scalability, security, or ease-of-use, among other possible aspects of performance.

DETAILED DESCRIPTION

Some organizations may implement techniques to identify where particular types of information (hereinafter "target type of information"), such as sensitive information (e.g., personally identifiable information (PII)), is stored in various data stores managed or accessed by the organization. For example, data stores may be scanned to identify the sensitive information to satisfy regulatory requirements or to preserve privacy. However, such scanning may be intrusive to data storage systems, as the scanning may impede or otherwise impact read or writes in a production environment.

Techniques described herein support data an iterative subsampling technique to identify where a target type of information is stored in a database. More particularly, the subsampling is performed using an iterative approach, and subsequent subsamples may drop or remove aspects (e.g., columns) of prior subsamples based on processing of information included in the prior subsamples. For example, a first set of queries may be used to identify a first subsample that includes a set of rows (including a set of columns) of data. The subsample may be processed to identify whether information (e.g., the values of a column) included in the subsample includes the target type of information. If a column does not include the target type of information (based on processing one or more first subsamples), the column may be dropped from subsequent sub-samples. That is, the first set of queries may be modified such that the next subsample does not include data from the column that is determined to not include the target type of information. A set of subsamples may be processed before a column is dropped from a subsequent query (e.g., based on a probability of a column not including target hits), and this procedure may be performed in an iterative manner (e.g., columns dropped and subsequent subsamples obtained. At the end of the subsampling process, the locations of the target type of data may be identified. These and other techniques are described in further detail with respect to the figures.

Figure 1:
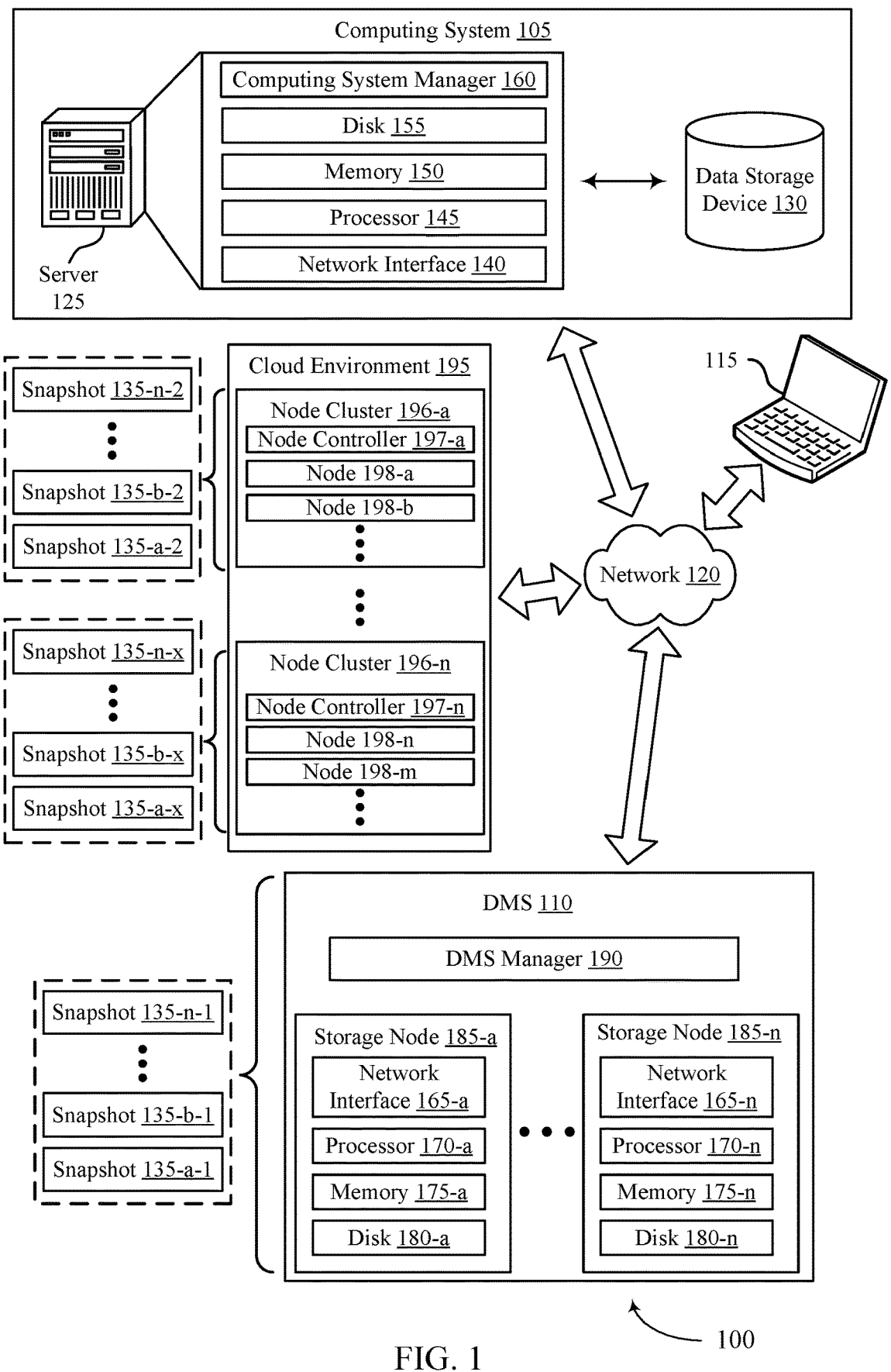
FIG. 1 illustrates an example of a computing environment that supports detection of target data in databases in accordance with aspects of the present disclosure.

FIG. 1 illustrates an example of a computing environment 100 that supports detection of target data in databases in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may function as an application server or a file server. In general, a server 125 may refer to one or more hardware devices that function as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as herein.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

Some computing systems may process data stores (e.g., the data storage device 130) to determine if and where a particular type of data, such as sensitive data, is stored. Sensitive data may include PII, health information, confidential information, or other types of sensitive information. Protection of such information ensures compliance with regulations and protects user privacy. The techniques described herein may be used to identify sensitive information, as well as other types of target information. Some techniques to identify target information may rely on exhaustive full table scans, which is a resource intensive process that demands significant computation power. Using these traditional techniques may impact production read and write I/O at the data store (e.g., the data storage device 130).

Techniques described herein address the foregoing by leveraging table sampling techniques to efficiently detect target data within databases. By extracting representative samples from large datasets, this approach may reduce the computational load required for analysis. Accordingly, these techniques support an efficient alternative to the heavy full table scans and enhance the overall efficiency and security of database management. In accordance with the procedures described herein, a target sample size for a given table within a database is determined. A heuristic approach is adopted to strike a balance between accuracy and computational efficiency in determining the target sample size. When the tables are small, a comprehensive full table scan may be conducted to ensure precise detection. However, for tables surpassing a threshold, the target sample size is inversely adjusted based on the table's dimensions to ensure representative coverage. The heuristic can also be adjusted based on the average table size of a given database server. By tailoring the sample size inversely on the table's dimensions, this approach ensures that even in the presence of vast datasets, the analysis remains both thorough and resource-efficient.

The tables may then be subsampled using randomized seeds interspersed with an appropriate interval between each iteration. By generating several smaller subsets (e.g., subsamples), subsampling provides a holistic view of the dataset without the computational overhead associated with larger sampling sizes. Based on the result of the analysis or processing of the subsample, columns that lack the presence of target data may be discarded from subsequent subsamples, which supports a refined sampling approach. As such, the attention shifts to the remaining columns of a data table. Sampling may continue until a point of consistency is discerned by processing of the subsamples. Accordingly, the iterative approach may support a streamlined and informed procedure for data refinement while also supporting the precision and stability of the analysis process.

Thus, in the context of FIG. 1, the computing system 105, the DMS 110, and/or the cloud environment 195 may implement the subsampling technique described herein. For example, the computing system 105 may obtain (e.g., using a first query) and process one or more subsamples of one or more data tables of the data storage device 130. If the computing systems 105 determines that one or more columns of the subsamples do not contain target data (e.g., based on a probability above a threshold), then the computing system 105 may generate one or more second queries, and the second query may be generated to exclude the one or more columns that are determined to not include target data. The second subsamples are processed and the subsampling continues until the computing system 105 identifies locations (if any) of target information within the data storage device 130. Additional techniques for determining the sample and/or subsample size, adjusting the size, and determining whether a column includes non-target data are described in further detail herein.

Figure 2:
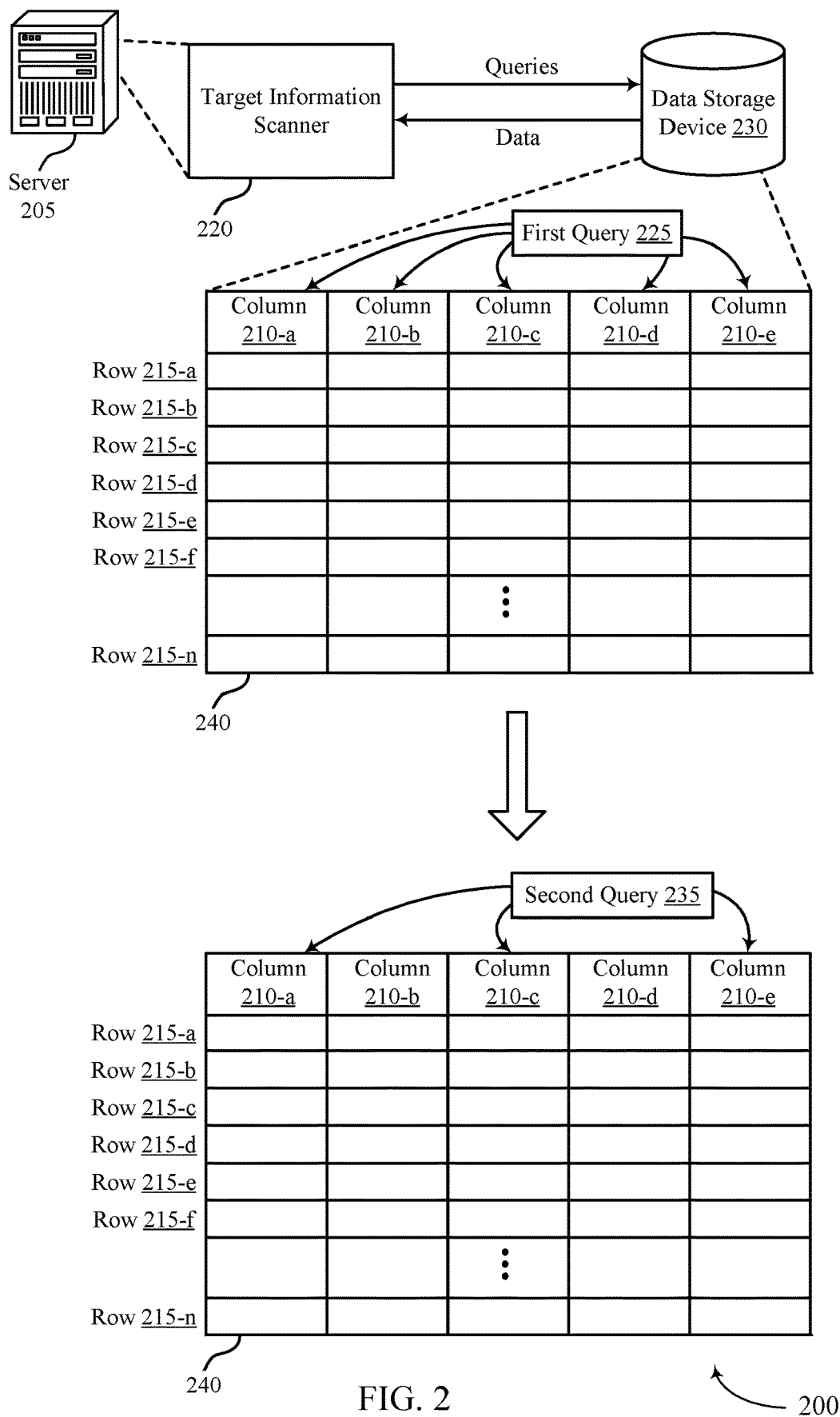
FIG. 2 shows an example of a computing environment that supports detection of target data in databases in accordance with aspects of the present disclosure.

FIG. 2 shows an example of a computing environment 200 that supports detection of target data in databases in accordance with aspects of the present disclosure. The computing environment 200 may implement or be implemented by aspects of the computing environment 100 of FIG. 1. The computing environment 100 includes a server 205, which may be an example of the server 125 or which may represent aspects of the cloud environment 195 or the DMS 110 of FIG. 1. The computing environment 200 also includes a data storage device 230, which may be an example of the data storage device 130, aspects of the cloud environment 195, or the DMS 110 of FIG. 1. The data storage device 230 may store, access, or otherwise manage data stored in one or more data tables, such as data table 240.

The data table 240 may correspond to a computing object that is accessed by one or more applications, such as client side applications.

The server 205 supports a target information scanner 220, which may represent a service that performs that target information scanning techniques described herein. The target information scanner 220 may be performed on production data, such as data stored in the data storage device 230 and/or backup data, such as data stored in the cloud environment 195 or the DMS 110 of FIG. 1.

As described herein, the target information scanner 220 may implement techniques to identify locations of target information in the data storage device 230, such as in rows 215 and/or columns 210 of the data table 240. To identify the target information in the data table 240, the target information scanner 220 may determine a percentage of the data table 240 to sample based on a state of the data table (e.g., an initial assumption), such as the size of the data table 240 (e.g., the quantity of rows 215 and/or columns 210), a population size of the data table 240, an initial assumption about the distribution of target information (e.g., based on the column/row names), a distribution or sparseness of data within the table, or a combination thereof. The target information scanner 220 may also determine a subsampling percentage based on the size of the data table, the size percentage of the sample, or a combination thereof. For example, if the data table is small, then the target information scanner 220 may determine to subsample the entire data table (e.g., a 100% sample). The target sample size may be inversely adjusted based on the table's dimensions to ensure a representative coverage. Additionally, the average table size of database tables accessible by the server 205 may be used to determine the target sample size.

The target information scanner 220 may begin subsampling the data table 240 and processing the corresponding data to determine whether the subsampled data includes target information. For example, a first set of subsamples may be generated using one or more first queries (e.g., a first query 225). Each first subsample may contain data from each of the columns 210 as illustrated by the first query 225. Further, a subsample may contain from a subset of rows 215 (e.g., ten rows) of the data table 240. Each of these first subsamples may be processed to determine whether a column 210-*b* contains target information or whether the column 210-*b* is likely (or not) to contain target information. For example, the target information scanner 220 may process subsamples (of different subsets of rows 215) with data from the same columns 210 until the target information scanner 220 determines that a column is likely (e.g., statically likely above a threshold) to contain information other than the target information.

Thus, if the target information scanner 220 determines that a column likely does not contain target information (e.g., the prediction reaches a threshold level of confidence), then the target information scanner may generate one or more second queries 235 that are configured to obtain data corresponding to a subset of the columns 210, and the subset of columns 210 may not include the columns that are identified as likely not containing target information. As illustrated in FIG. 2, the second query 235 is configured to obtain data from columns 210-*a*, 210-*c*, and 210-*e*, which does not include column 210-*b* and 210-*d*, which the first query 225 included. The data of these second samples including data from columns 210-*a*, 210-*c*, and 210-*e* may be processed to determine whether target type of information is included and the data may be sampled until the target information scanner 220 converges on a confidence level of a column including information other than the target type of information or until the target information scanner 220 determines (e.g., based on a confidence level) that the remaining columns 210 (e.g., the columns which are still included in subsamples) contain the target type of information.

Accordingly, the target information scanner 220 may continuously obtain subsamples (e.g., using queries) and eliminate columns from subsamples until the threshold sample size is satisfied. In some cases, the sample size, the subsample size, or both are adjusted during this procedure based on results of processing of sample sizes. For example, the sampling percentage is updated dynamically during the process. Initially, an initial fixed sampling percentage and a low sub-sampling percentage are chosen. The initial fixed sampling percentage may be based on initial assumptions of the population size and distribution, as well as expected positivity rate for finding the target type of data. As the first subsample is obtained and processed, an initial idea of the positivity rate is obtained and the target sampling percentage may be adjusted based on the observed positivity rate. Both the initial assumptions about the population size and distribution, as well as the dynamic adjustment of the target sampling percentage, provides a low sampling percentage that supports an accurate determination of the positivity rate.

Additionally, the determination of whether a column is removed for a subsequent subsample may be based on processing of subsamples. Statistical principles may be applied to determine, with high statistical confidence, whether a column 210 has the target type of data or not. Initially, a sub-sample may have a low enough population to confirm with high confidence that the column does not have the target type of data, but as more sub-samples are obtained, the confidence may cross a high confidence statistical threshold. In such cases, the target information scanner 220 may determine that the column has the target type of data, and eliminate the column from further introspection. As such, columns that are determined to include the target type of information (with a confidence level exceeding a threshold) and columns that are determined to include information other than the target type of information (with a confidence level exceeding a threshold) may be removed from subsequent subsamples.

To identify potential target information in the subsamples, the target information scanner 220 may implement one or more various techniques. For example, the target information scanner 220 may use regular expressions (Regex), pattern identification or pattern matching techniques, or the like. Additionally, the target information scanner 220 may leverage one or more libraries that are configured for identification of the target type of information, such as sensitive information. For example, libraries that are configured for identification of PII, credit card information, health information, or the like, may be used to identify whether subsampled data includes sensitive information. Similar techniques and libraries may be used to identify other types of target information.

As noted, the techniques described herein may be used to identify various types of target information, including sensitive information. Other types of target information are contemplated within the scope of the present disclosure. For example, the techniques described herein may be used to identify whether databases include address information, sales information, accounting information, geographic information or geological information, etc. That is, any type of information that may be identified using pattern matching techniques, information extraction techniques, Regex techniques, or the like, may be examples of target information as described herein.

As described herein, the sampling/subsampling may be performed randomly such as to provide an accurate picture of the population. For example, random seed values may be used to generate the subsamples (e.g., a subset of columns) and subsamples may not have overlapping rows 215. That is, each subsequent subsample may contain a different subset of rows 215 such that a complete picture of the data is provided for processing.

Figure 3:
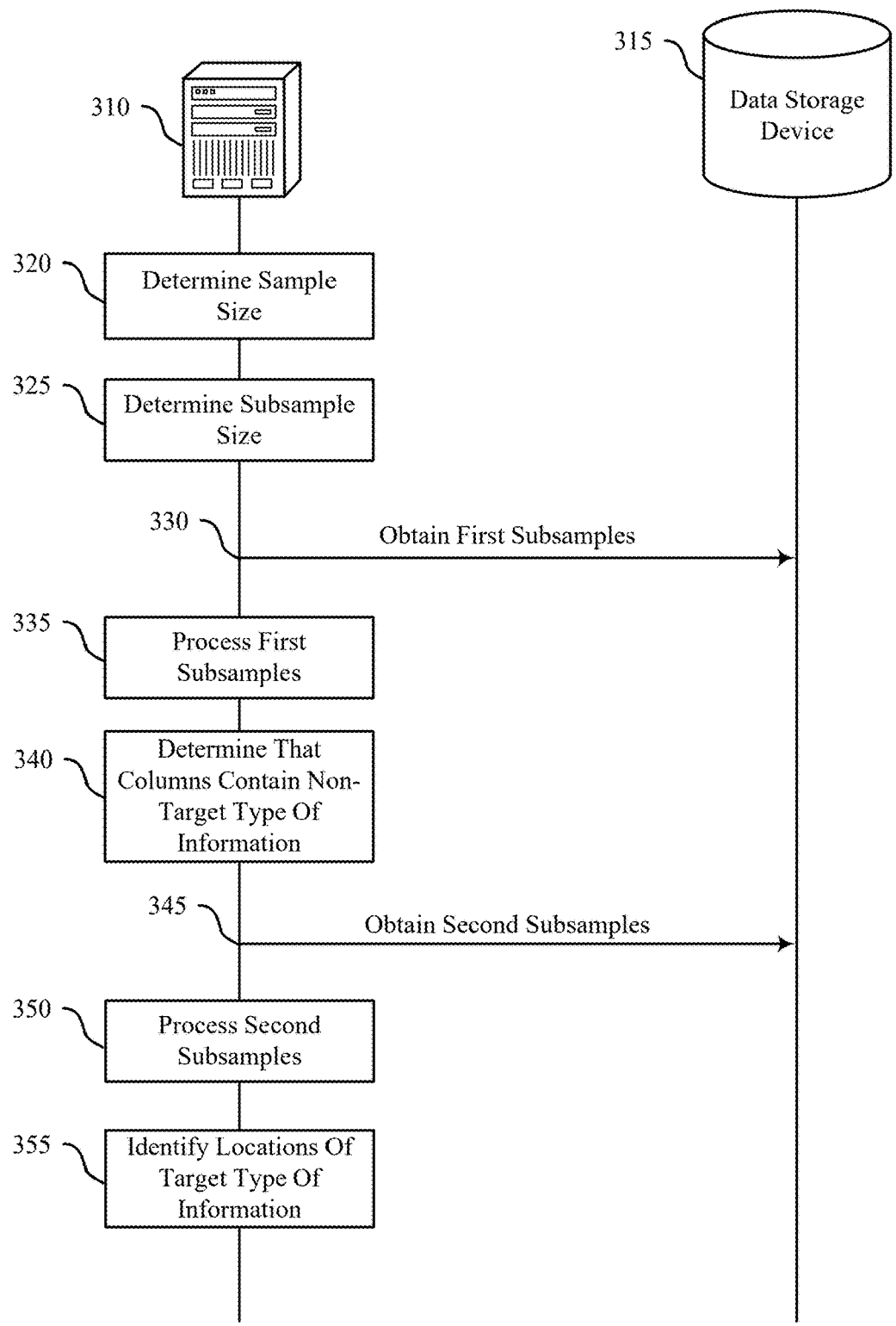
FIG. 3 shows an example of a process flow that supports detection of target data in databases in accordance with aspects of the present disclosure.

FIG. 3 shows an example of a process flow 300 that supports detection of target data in databases in accordance with aspects of the present disclosure. The process flow 300 includes a server 310 and a data storage device 315, which may be examples of the corresponding devices as described with respect to FIGS. 1 and 2. The server 310 may be an example of or represent one or more servers that support a DMS 110, a computing system 105, or a cloud environment 195 as described with respect to FIG. 1. The data storage device 315 may include or represent a database server that includes one or more database tables as described herein. In the following description of the process flows 300, operations may be added, omitted, or performed in a different order (with respect to the exemplary order shown).

At 320, the server 310 may determine a sampling percentage that results in a first sample in accordance with a state of the data table. The state of the data table may include a size of the data table, a population size of the data table, a distribution of data within the data table, or a combination thereof.

At 325, the server 310 may determine a subsampling percentage that results in a first subsample in accordance with the size of the data table or a sampling percentage for the first sample.

At 330, the server 310 may obtain one or more first subsamples of a first sample of a data table. The one or more first subsamples may include information from the first quantity of columns of the data table. To obtain the one or more first subsamples, the server 310 may generate and execute a first query that is configured to obtain the data from the first quantity of columns.

At 335, the server 310 may process the one or more first subsamples of the data table to identify whether the information included in the one or more first subsamples comprises a target type of information. Processing the one or more subsamples may include implementing various techniques for identifying sensitive information and also determining that a column includes sensitive information with a confidence level above a threshold.

At 340, the server 310 may determine that one or more columns contain non-sensitive information (e.g., information other than sensitive information). As described herein, the server 310 may determine, with a confidence level above a threshold, that the column includes the non-sensitive information.

At 345, the server 310 may obtain a second subsample of the first sample of the data table. The second subsample may include information from a subset of columns of the first quantity of columns, and the subset excludes one or more columns of the first quantity that comprise information other than the target type of information. To obtain the second subsample, the server 310 may generate a query that is configured to drop or exclude data from the columns that do not include sensitive information.

At 350, the server 310 may process the second subsample of the data table to identify whether information included in the subset comprises the target type of information. Processing the second sub-sample may include similar techniques as processing the first subsample, but the server 310 may persist metrics (e.g., sensitive information likelihood metrics) associated with columns via processing of the first subsample such that the processing of the second subsample is based on this information. The process of obtaining subsamples and dropping columns from consideration may be repeated until a target sample size is reached, or a confidence level threshold associated with sensitive information predictions for one or more columns is satisfied, or both. Accordingly, after a column is dropped, less data is obtained via subsampling, which results in improved processing efficiency and reduced impacts on the production environment.

At 355, the server 310 may identify, based at least in part on processing the one or more first subsamples and the second subsample, one or more locations of the target type of information within the data table. The locations may include information that indicates tables, columns, rows, databases, or the like.

As described herein, the server 310 may adjust the subsampling percentage in accordance with a result of processing the one or more first subsamples, the second subsample, or both. For example, the server 310 may increase the subsampling percentage in accordance with a positivity rate of identifying sensitive information in the one or more first subsamples, the second subsample, or both. Thus, if the positivity rate of identifying sensitive information is relatively high, then the subsampling percentage may be increased (e.g., adjusted from 1% to 3%). Additionally, the subsampling rate or interval may be based on various parameters. For example, a first subsample may be obtained at a first tie and a second subsample may be obtained a at second time, and the interval between the first time and the second time may be based on production activity patterns within the data table, a predefined time interval, sample size for the first sample, a subsample size of the one or more first subsamples or the second subsample, or a combination thereof. Thus, the subsampling times may be scheduled such as to not interfere with periods of high production activity. Further, if subsample sizes are relatively large, then the intervals between subsample sizes may be spaced relatively long such as to limit interference with the production environment.

Figure 4:
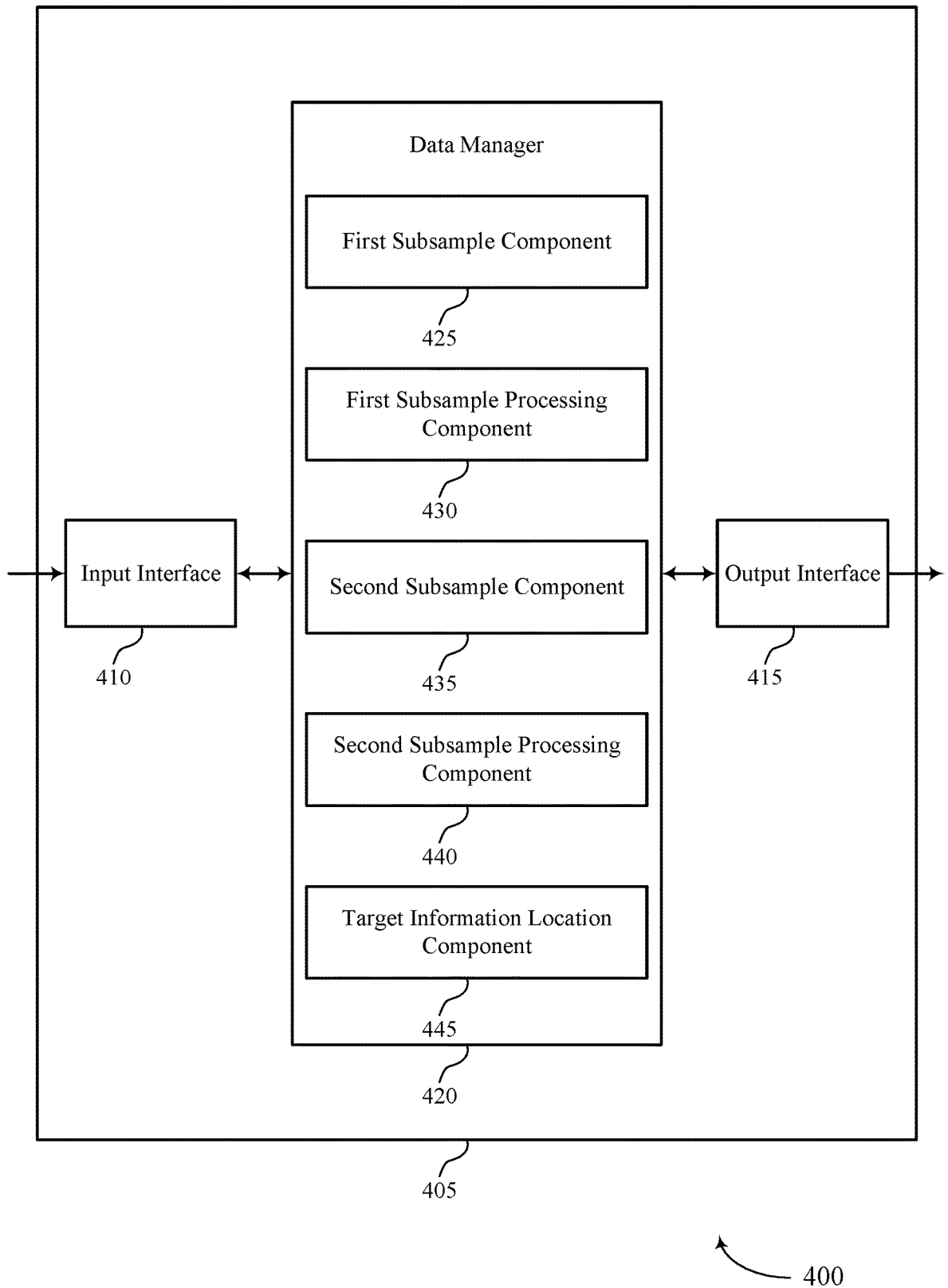
FIG. 4 shows a block diagram of an apparatus that supports detection of target data in databases in accordance with aspects of the present disclosure.

FIG. 4 shows a block diagram 400 of a system 405 that supports detection of target data in databases in accordance with aspects of the present disclosure. In some examples, the system 405 may be an example of aspects of one or more components described with reference to FIG. 1, such as a DMS 110. The system 405 may include an input interface 410, an output interface 415, and a data manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the data manager 420 to support detection of target data in databases. In some cases, the input interface 410 may be a component of a network interface 625 as described with reference to FIG. 6.

The output interface 415 may manage output signaling for the system 405. For example, the output interface 415 may receive signaling from other components of the system 405, such as the data manager 420, and may transmit such output signaling corresponding to (e.g., representative of or otherwise based on) such signaling to other systems or devices. In some cases, the output interface 415 may be a component of a network interface 625 as described with reference to FIG. 6.

For example, the data manager 420 may include a first subsample component 425, a first subsample processing component 430, a second subsample component 435, a second subsample processing component 440, a target information location component 445, or any combination thereof. In some examples, the data manager 420, or various components thereof, may be configured to perform various operations (e.g., receiving, monitoring, transmitting) using or otherwise in cooperation with the input interface 410, the output interface 415, or both. For example, the data manager 420 may receive information from the input interface 410, send information to the output interface 415, or be integrated in combination with the input interface 410, the output interface 415, or both to receive information, transmit information, or perform various other operations as described herein.

The data manager 420 may support data management in accordance with examples as disclosed herein. The first subsample component 425 may be configured as or otherwise support a means for obtaining one or more first subsamples of a first sample of a data table, the one or more first subsamples including information from a first quantity of columns of the data table. The first subsample processing component 430 may be configured as or otherwise support a means for processing the one or more first subsamples of the data table to identify whether the information included in the one or more first subsamples includes a target type of information. The second subsample component 435 may be configured as or otherwise support a means for obtaining a second subsample of the first sample of the data table, the second subsample including information from a subset of columns of the first quantity of columns, where the subset excludes one or more columns of the first subset that include information other than the target type of information. The second subsample processing component 440 may be configured as or otherwise support a means for processing the second subsample of the data table to identify whether information included in the subset includes the target type of information. The target information location component 445 may be configured as or otherwise support a means for identifying, based on processing the one or more first subsamples and the second subsample, one or more locations of the target type of information within the data table.

Figure 5:
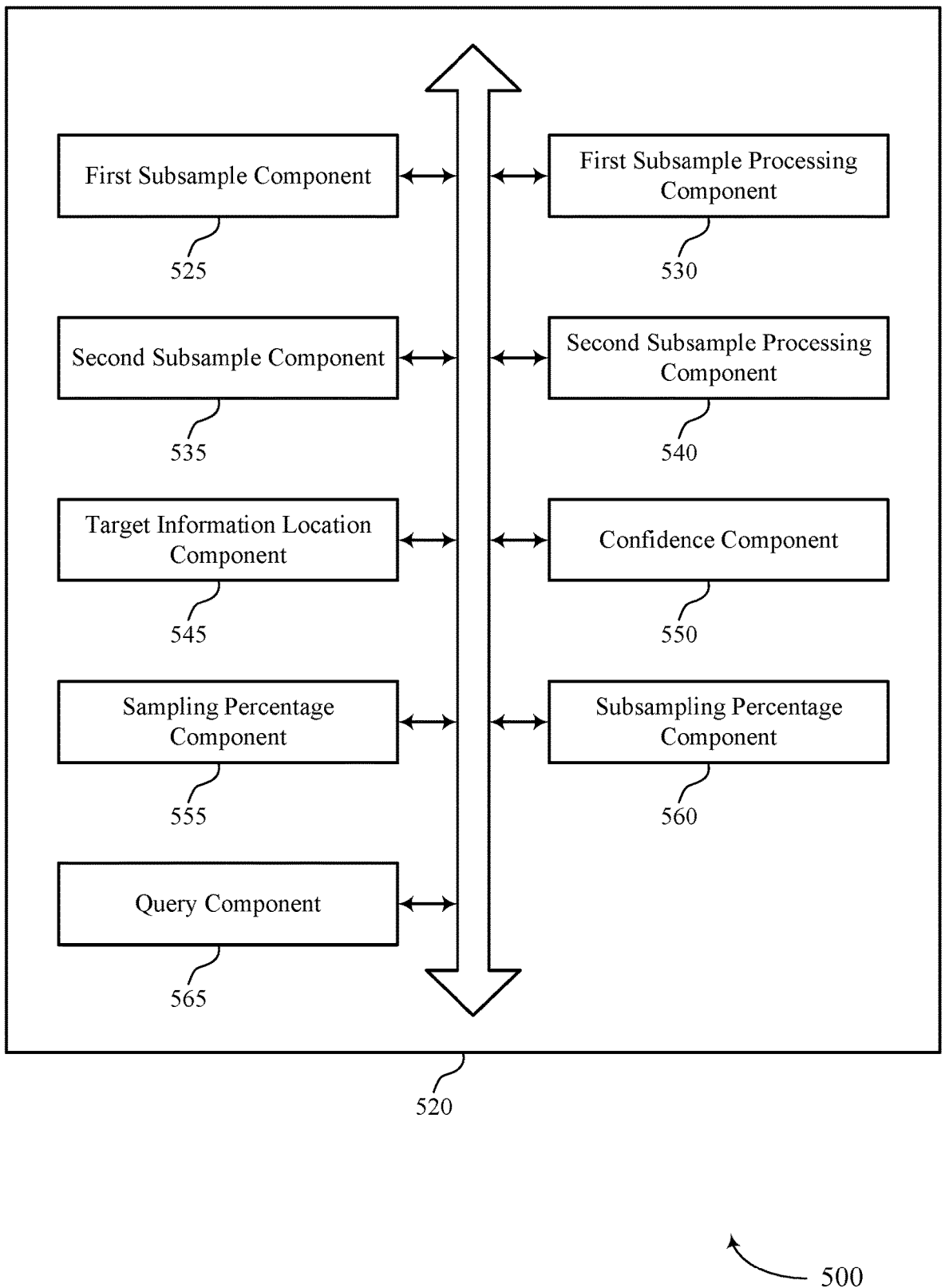
FIG. 5 shows a block diagram of a data manager that supports detection of target data in databases in accordance with aspects of the present disclosure.

FIG. 5 shows a block diagram 500 of a data manager 520 that supports detection of target data in databases in accordance with aspects of the present disclosure. The data manager 520 may be an example of aspects of a data manager or a data manager 420, or both, as described herein. The data manager 520, or various components thereof, may be an example of means for performing various aspects of detection of target data in databases as described herein. For example, the data manager 520 may include a first subsample component 525, a first subsample processing component 530, a second subsample component 535, a second subsample processing component 540, a target information location component 545, a confidence component 550, a sampling percentage component 555, a subsampling percentage component 560, a query component 565, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The data manager 520 may support data management in accordance with examples as disclosed herein. The first subsample component 525 may be configured as or otherwise support a means for obtaining one or more first subsamples of a first sample of a data table, the one or more first subsamples including information from a first quantity of columns of the data table. The first subsample processing component 530 may be configured as or otherwise support a means for processing the one or more first subsamples of the data table to identify whether the information included in the one or more first subsamples includes a target type of information. The second subsample component 535 may be configured as or otherwise support a means for obtaining a second subsample of the first sample of the data table, the second subsample including information from a subset of columns of the first quantity of columns, where the subset excludes one or more columns of the first subset that include information other than the target type of information. The second subsample processing component 540 may be configured as or otherwise support a means for processing the second subsample of the data table to identify whether information included in the subset includes the target type of information. The target information location component 545 may be configured as or otherwise support a means for identifying, based on processing the one or more first subsamples and the second subsample, one or more locations of the target type of information within the data table.

In some examples, the second subsample processing component 540 may be configured as or otherwise support a means for obtaining one or more additional subsamples of the first sample subsequent to obtaining the second subsample, where the one or more additional subsamples include information from a second subset of the subset of columns, where the second subset excludes one or more second columns of the subset that include information other than the target type of information.

In some examples, the confidence component 550 may be configured as or otherwise support a means for determining, based on processing the one or more first subsamples of the data table, that the one or more columns include the information other than the target type of information with a confidence level above a threshold, where the second subsample is obtained in response to determining that the confidence level is above the threshold.

In some examples, the query component 565 may be configured as or otherwise support a means for generating a second query to exclude the one or more columns in response to determining that the confidence level is above the threshold, where the second query is configured to obtain the second subsample.

In some examples, additional first subsamples are obtained and processed until the confidence level is reached with respect to the one or more columns.

In some examples, the sampling percentage component 555 may be configured as or otherwise support a means for determining a sampling percentage that results in the first sample in accordance with a state of the data table. In some examples, the sampling percentage component 555 may be configured as or otherwise support a means for adjusting the sampling percentage in accordance with a result of processing the one or more first subsamples, the second subsample, or both.

In some examples, the state of the data table includes a size of the data table, a population size of the data table, a distribution of data within the data table, or a combination thereof.

In some examples, the subsampling percentage component 560 may be configured as or otherwise support a means for determining a subsampling percentage that results in a first subsample of the one or more first subsamples in accordance with a size of the data table or a sampling percentage for the first sample. In some examples, the subsampling percentage component 560 may be configured as or otherwise support a means for adjusting the subsampling percentage in accordance with a result of processing the one or more first subsamples, the second subsample, or both.

In some examples, to support adjusting the subsampling percentage, the subsampling percentage component 560 may be configured as or otherwise support a means for increasing the subsampling percentage in accordance with a positivity rate of identifying the target type of information in the one or more first subsamples, the second subsample, or both.

In some examples, to support obtaining the one or more first subsamples and the second subsample, the query component 565 may be configured as or otherwise support a means for executing, to obtain a first subsample of the one or more first subsamples, a first query for a first set of multiple rows in the data table, the first set of multiple rows including the information from the first quantity of columns. In some examples, to support obtaining the one or more first subsamples and the second subsample, the query component 565 may be configured as or otherwise support a means for executing, to obtain the second subsample, a second query for a second set of multiple rows in the data table, the second set of multiple rows including the information form the subset of columns, where the second query is configured to exclude the one or more columns that include information other than the target type of information.

In some examples, a first subsample is obtained at a first time and the second subsample is obtained at a second time. In some examples, the first time and the second time are based on production activity patterns within the data table, a predefined time interval, sample size for the first sample, a subsample size of the one or more first subsamples or the second subsample, or a combination thereof.

In some examples, the sampling percentage component 555 may be configured as or otherwise support a means for processing subsamples subsequent to the second subsample until satisfaction of a threshold percentage of the data table, until satisfaction of a confidence level with respect to identification of the target type of information in columns of the data table, or a combination thereof.

Figure 6:
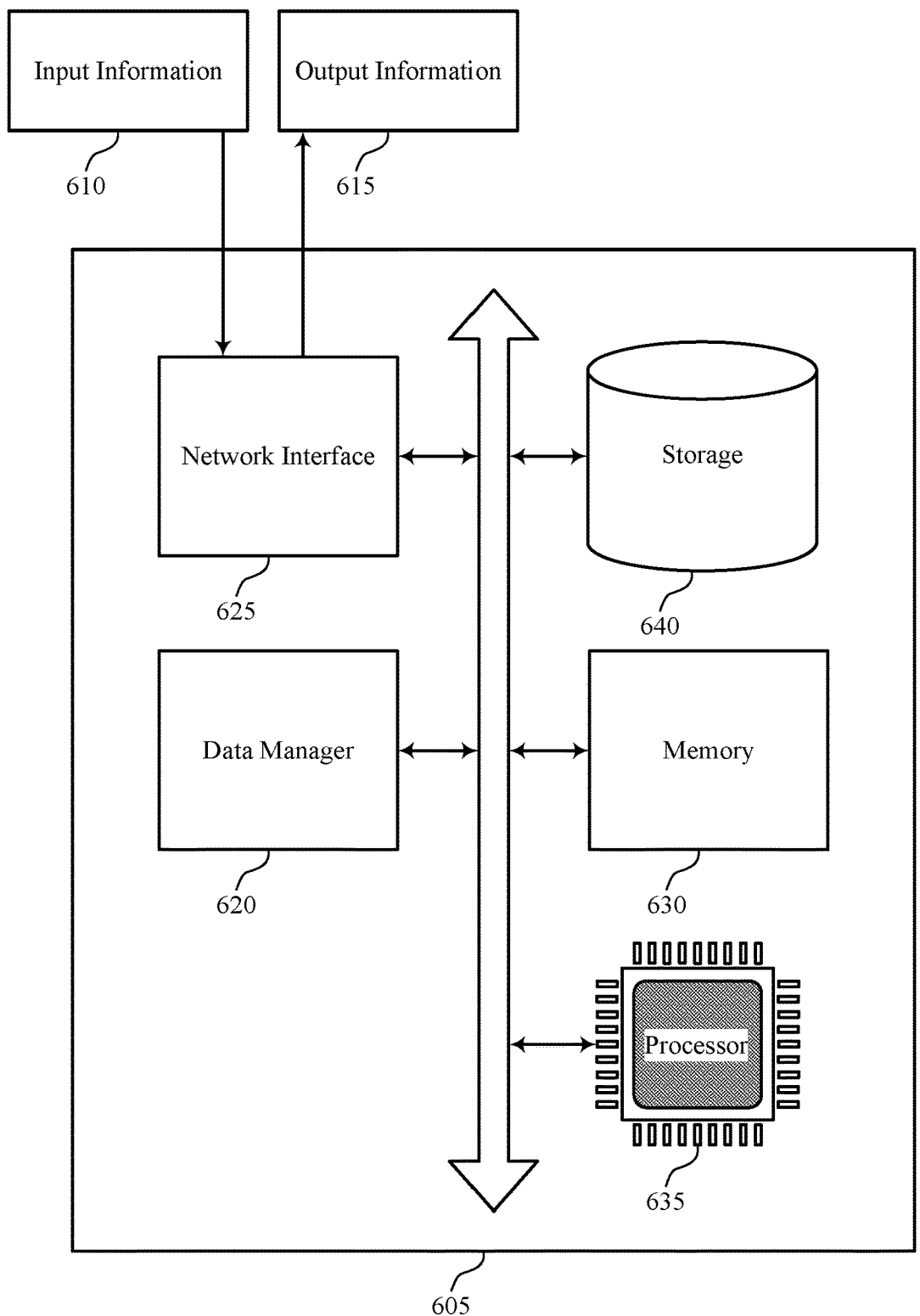
FIG. 6 shows a diagram of a system including a device that supports detection of target data in databases in accordance with aspects of the present disclosure.

FIG. 6 shows a block diagram 600 of a system 605 that supports detection of target data in databases in accordance with aspects of the present disclosure. The system 605 may be an example of or include the components of a system 405 as described herein. The system 605 may include components for data management, including components such as a data manager 620, an input information 610, an output information 615, a network interface 625, at least one memory 630, at least one processor 635, and a storage 640. These components may be in electronic communication or otherwise coupled with each other (e.g., operatively, communicatively, functionally, electronically, electrically; via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting detection of target data in databases). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

The data manager 620 may support data management in accordance with examples as disclosed herein. For example, the data manager 620 may be configured as or otherwise support a means for obtaining one or more first subsamples of a first sample of a data table, the one or more first subsamples including information from a first quantity of columns of the data table. The data manager 620 may be configured as or otherwise support a means for processing the one or more first subsamples of the data table to identify whether the information included in the one or more first subsamples includes a target type of information. The data manager 620 may be configured as or otherwise support a means for obtaining a second subsample of the first sample of the data table, the second subsample including information from a subset of columns of the first quantity of columns, where the subset excludes one or more columns of the first subset that include information other than the target type of information. The data manager 620 may be configured as or otherwise support a means for processing the second subsample of the data table to identify whether information included in the subset includes the target type of information. The data manager 620 may be configured as or otherwise support a means for identifying, based at least in part on processing the one or more first subsamples and the second subsample, one or more locations of the target type of information within the data table.

By including or configuring the data manager 620 in accordance with examples as described herein, the system 605 may support techniques for detection of target data in databases, which may provide one or more benefits such as, for example reduced processing and resource overhead due to accessing and processing less data relative to other information processing techniques, among other possibilities.

Figure 7:
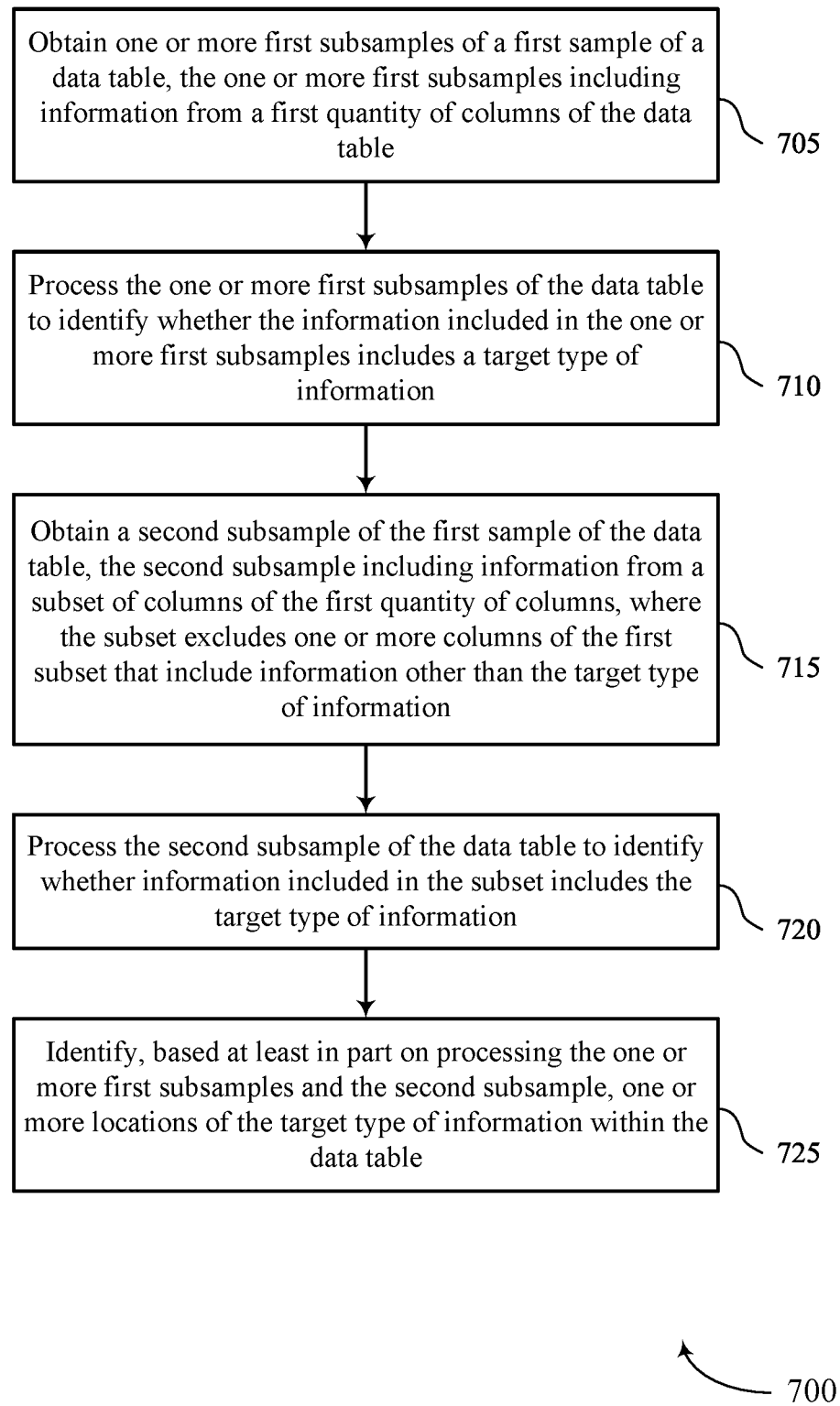
FIGS. 7 through 10 show flowcharts illustrating methods that support detection of target data in databases in accordance with aspects of the present disclosure.

FIG. 7 shows a flowchart illustrating a method 700 that supports detection of target data in databases in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include obtaining one or more first subsamples of a first sample of a data table, the one or more first subsamples including information from a first quantity of columns of the data table. The operations of block 705 may be performed in accordance with examples as disclosed herein. In some examples, aspects of the operations of 705 may be performed by a first subsample component 525 as described with reference to FIG. 5.

At 710, the method may include processing the one or more first subsamples of the data table to identify whether the information included in the one or more first subsamples includes a target type of information. The operations of block 710 may be performed in accordance with examples as disclosed herein. In some examples, aspects of the operations of 710 may be performed by a first subsample processing component 530 as described with reference to FIG. 5.

At 715, the method may include obtaining a second subsample of the first sample of the data table, the second subsample including information from a subset of columns of the first quantity of columns, where the subset excludes one or more columns of the first subset that include information other than the target type of information. The operations of block 715 may be performed in accordance with examples as disclosed herein. In some examples, aspects of the operations of 715 may be performed by a second subsample component 535 as described with reference to FIG. 5.

At 720, the method may include processing the second subsample of the data table to identify whether information included in the subset includes the target type of information. The operations of block 720 may be performed in accordance with examples as disclosed herein. In some examples, aspects of the operations of 720 may be performed by a second subsample processing component 540 as described with reference to FIG. 5.

At 725, the method may include identifying, based on processing the one or more first subsamples and the second subsample, one or more locations of the target type of information within the data table. The operations of block 725 may be performed in accordance with examples as disclosed herein. In some examples, aspects of the operations of 725 may be performed by a target information location component 545 as described with reference to FIG. 5.

Figure 8:
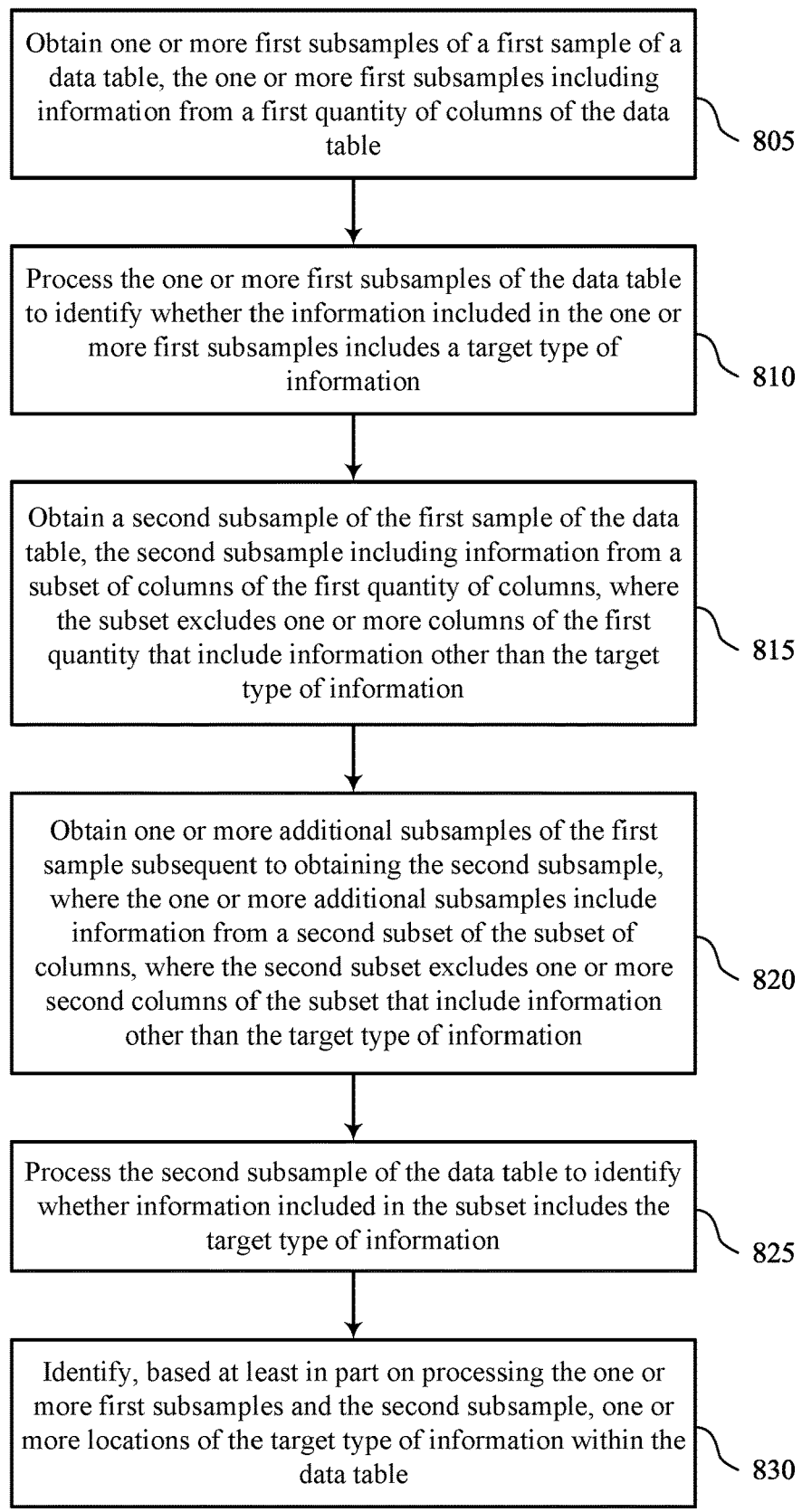

FIG. 8 shows a flowchart illustrating a method 800 that supports detection of target data in databases in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include obtaining one or more first subsamples of a first sample of a data table, the one or more first subsamples including information from a first quantity of columns of the data table. The operations of block 805 may be performed in accordance with examples as disclosed herein. In some examples, aspects of the operations of 805 may be performed by a first subsample component 525 as described with reference to FIG. 5.

At 810, the method may include processing the one or more first subsamples of the data table to identify whether the information included in the one or more first subsamples includes a target type of information. The operations of block 810 may be performed in accordance with examples as disclosed herein. In some examples, aspects of the operations of 810 may be performed by a first subsample processing component 530 as described with reference to FIG. 5.

At 815, the method may include obtaining a second subsample of the first sample of the data table, the second subsample including information from a subset of columns of the first quantity of columns, where the subset excludes one or more columns of the first subset that include information other than the target type of information. The operations of block 815 may be performed in accordance with examples as disclosed herein. In some examples, aspects of the operations of 815 may be performed by a second subsample component 535 as described with reference to FIG. 5.

At 820, the method may include obtaining one or more additional subsamples of the first sample subsequent to obtaining the second subsample, where the one or more additional subsamples include information from a second subset of the subset of columns, where the second subset excludes one or more second columns of the subset that include information other than the target type of information. The operations of block 820 may be performed in accordance with examples as disclosed herein. In some examples, aspects of the operations of 820 may be performed by a second subsample processing component 540 as described with reference to FIG. 5.

At 825, the method may include processing the second subsample of the data table to identify whether information included in the subset includes the target type of information. The operations of block 825 may be performed in accordance with examples as disclosed herein. In some examples, aspects of the operations of 825 may be performed by a second subsample processing component 540 as described with reference to FIG. 5.

At 830, the method may include identifying, based on processing the one or more first subsamples and the second subsample, one or more locations of the target type of information within the data table. The operations of block 830 may be performed in accordance with examples as disclosed herein. In some examples, aspects of the operations of 830 may be performed by a target information location component 545 as described with reference to FIG. 5.

Figure 9:
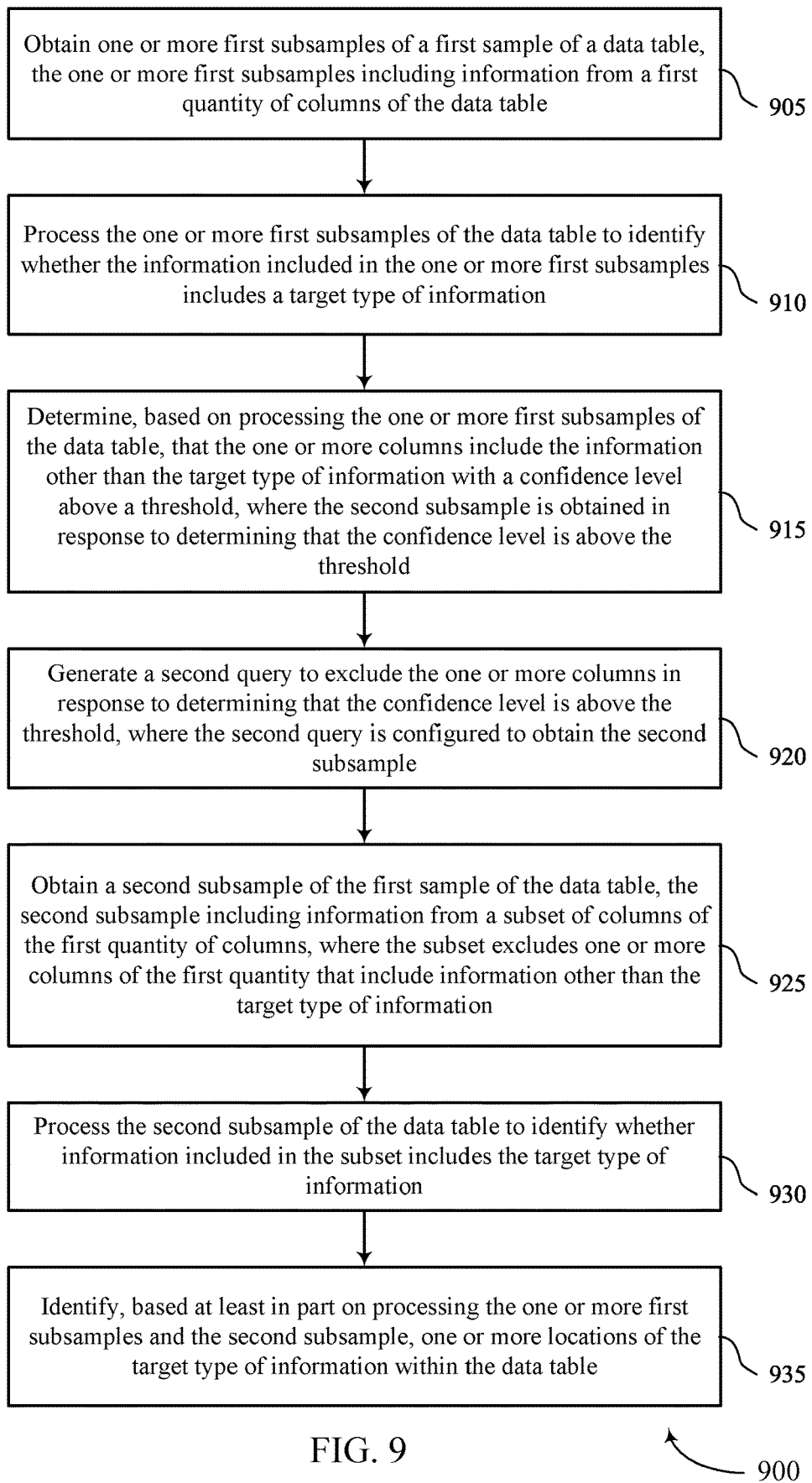

FIG. 9 shows a flowchart illustrating a method 900 that supports detection of target data in databases in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include obtaining one or more first subsamples of a first sample of a data table, the one or more first subsamples including information from a first quantity of columns of the data table. The operations of block 905 may be performed in accordance with examples as disclosed herein. In some examples, aspects of the operations of 905 may be performed by a first subsample component 525 as described with reference to FIG. 5.

At 910, the method may include processing the one or more first subsamples of the data table to identify whether the information included in the one or more first subsamples includes a target type of information. The operations of block 910 may be performed in accordance with examples as disclosed herein. In some examples, aspects of the operations of 910 may be performed by a first subsample processing component 530 as described with reference to FIG. 5.

At 915, the method may include determining, based on processing the one or more first subsamples of the data table, that the one or more columns include the information other than the target type of information with a confidence level above a threshold, where the second subsample is obtained in response to determining that the confidence level is above the threshold. The operations of block 915 may be performed in accordance with examples as disclosed herein. In some examples, aspects of the operations of 915 may be performed by a confidence component 550 as described with reference to FIG. 5.

At 920, the method may include generating a second query to exclude the one or more columns in response to determining that the confidence level is above the threshold, where the second query is configured to obtain the second subsample. The operations of block 920 may be performed in accordance with examples as disclosed herein. In some examples, aspects of the operations of 920 may be performed by a query component 565 as described with reference to FIG. 5.

At 925, the method may include obtaining a second subsample of the first sample of the data table, the second subsample including information from a subset of columns of the first quantity of columns, where the subset excludes one or more columns of the first subset that include information other than the target type of information. The operations of block 925 may be performed in accordance with examples as disclosed herein. In some examples, aspects of the operations of 925 may be performed by a second subsample component 535 as described with reference to FIG. 5.

At 930, the method may include processing the second subsample of the data table to identify whether information included in the subset includes the target type of information. The operations of block 930 may be performed in accordance with examples as disclosed herein. In some examples, aspects of the operations of 930 may be performed by a second subsample processing component 540 as described with reference to FIG. 5.

At 935, the method may include identifying, based on processing the one or more first subsamples and the second subsample, one or more locations of the target type of information within the data table. The operations of block 935 may be performed in accordance with examples as disclosed herein. In some examples, aspects of the operations of 935 may be performed by a target information location component 545 as described with reference to FIG. 5.

Figure 10:
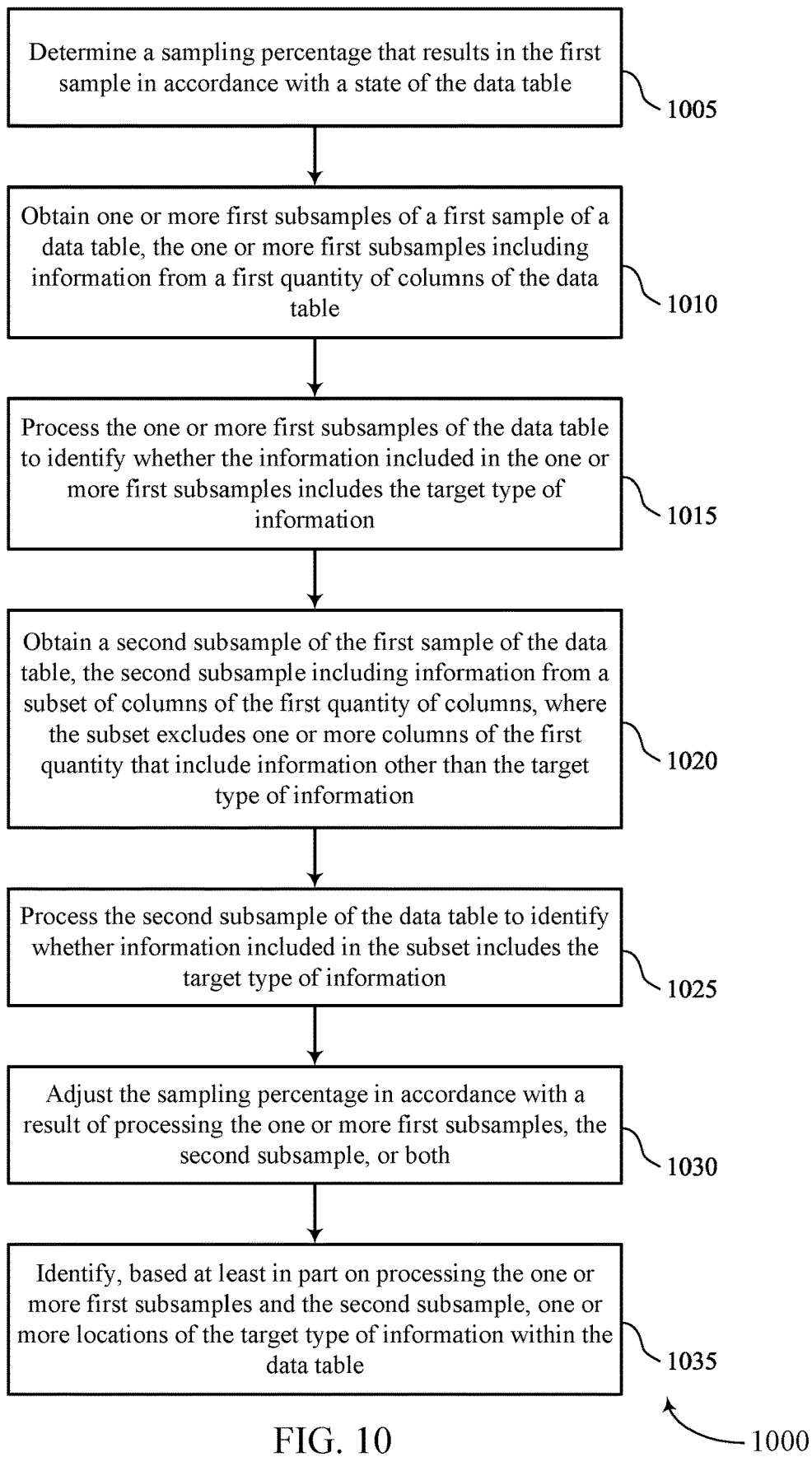

FIG. 10 shows a flowchart illustrating a method 1000 that supports detection of target data in databases in accordance with aspects of the present disclosure. The operations of the method 1000 may be implemented by a DMS or its components as described herein. For example, the operations of the method 1000 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 1005, the method may include determining a sampling percentage that results in the first sample in accordance with a state of the data table. The operations of block 1005 may be performed in accordance with examples as disclosed herein. In some examples, aspects of the operations of 1005 may be performed by a sampling percentage component 555 as described with reference to FIG. 5.

At 1010, the method may include obtaining one or more first subsamples of a first sample of a data table, the one or more first subsamples including information from a first quantity of columns of the data table. The operations of block 1010 may be performed in accordance with examples as disclosed herein. In some examples, aspects of the operations of 1010 may be performed by a first subsample component 525 as described with reference to FIG. 5.

At 1015, the method may include processing the one or more first subsamples of the data table to identify whether the information included in the one or more first subsamples includes a target type of information. The operations of block 1015 may be performed in accordance with examples as disclosed herein. In some examples, aspects of the operations of 1015 may be performed by a first subsample processing component 530 as described with reference to FIG. 5.

At 1020, the method may include obtaining a second subsample of the first sample of the data table, the second subsample including information from a subset of columns of the first quantity of columns, where the subset excludes one or more columns of the first subset that include information other than the target type of information. The operations of block 1020 may be performed in accordance with examples as disclosed herein. In some examples, aspects of the operations of 1020 may be performed by a second subsample component 535 as described with reference to FIG. 5.

At 1025, the method may include processing the second subsample of the data table to identify whether information included in the subset includes the target type of information. The operations of block 1025 may be performed in accordance with examples as disclosed herein. In some examples, aspects of the operations of 1025 may be performed by a second subsample processing component 540 as described with reference to FIG. 5.

At 1030, the method may include adjusting the sampling percentage in accordance with a result of processing the one or more first subsamples, the second subsample, or both. The operations of block 1030 may be performed in accordance with examples as disclosed herein. In some examples, aspects of the operations of 1030 may be performed by a sampling percentage component 555 as described with reference to FIG. 5.

At 1035, the method may include identifying, based on processing the one or more first subsamples and the second subsample, one or more locations of the target type of information within the data table. The operations of block 1035 may be performed in accordance with examples as disclosed herein. In some examples, aspects of the operations of 1035 may be performed by a target information location component 545 as described with reference to FIG. 5.

A method for data management by an apparatus is described. The method may include obtaining one or more first subsamples of a first sample of a data table, the one or more first subsamples including information from a first quantity of columns of the data table, processing the one or more first subsamples of the data table to identify whether the information included in the one or more first subsamples includes a target type of information, obtaining a second subsample of the first sample of the data table, the second subsample including information from a subset of columns of the first quantity of columns, where the subset excludes one or more columns of the first subset that include information other than the target type of information, processing the second subsample of the data table to identify whether information included in the subset includes the target type of information, and identifying, based on processing the one or more first subsamples and the second subsample, one or more locations of the target type of information within the data table.

An apparatus for data management is described. The apparatus may include one or more memories storing processor executable code, and one or more processors coupled with the one or more memories. The one or more processors may individually or collectively operable to execute the code to cause the apparatus to obtain one or more first subsamples of a first sample of a data table, the one or more first subsamples including information from a first quantity of columns of the data table, process the one or more first subsamples of the data table to identify whether the information included in the one or more first subsamples includes a target type of information, obtain a second subsample of the first sample of the data table, the second subsample including information from a subset of columns of the first quantity of columns, where the subset excludes one or more columns of the first subset that include information other than the target type of information, process the second subsample of the data table to identify whether information included in the subset includes the target type of information, and identify, based at least in part on processing the one or more first subsamples and the second subsample, one or more locations of the target type of information within the data table.

Another apparatus for data management is described. The apparatus may include means for obtaining one or more first subsamples of a first sample of a data table, the one or more first subsamples including information from a first quantity of columns of the data table, means for processing the one or more first subsamples of the data table to identify whether the information included in the one or more first subsamples includes a target type of information, means for obtaining a second subsample of the first sample of the data table, the second subsample including information from a subset of columns of the first quantity of columns, where the subset excludes one or more columns of the first subset that include information other than the target type of information, means for processing the second subsample of the data table to identify whether information included in the subset includes the target type of information, and means for identifying, based on processing the one or more first subsamples and the second subsample, one or more locations of the target type of information within the data table.

A non-transitory computer-readable medium storing code for data management is described. The code may include instructions executable by a processor to obtain one or more first subsamples of a first sample of a data table, the one or more first subsamples including information from a first quantity of columns of the data table, process the one or more first subsamples of the data table to identify whether the information included in the one or more first subsamples includes a target type of information, obtain a second subsample of the first sample of the data table, the second subsample including information from a subset of columns of the first quantity of columns, where the subset excludes one or more columns of the first subset that include information other than the target type of information, process the second subsample of the data table to identify whether information included in the subset includes the target type of information, and identify, based at least in part on processing the one or more first subsamples and the second subsample, one or more locations of the target type of information within the data table.

Some examples of the method, apparatus, and non-transitory computer-readable medium described herein may further include operations, features, means, or instructions for obtaining one or more additional subsamples of the first sample subsequent to obtaining the second subsample, where the one or more additional subsamples include information from a second subset of the subset of columns, where the second subset excludes one or more second columns of the subset that include information other than the target type of information.

Some examples of the method, apparatus, and non-transitory computer-readable medium described herein may further include operations, features, means, or instructions for determining, based on processing the one or more first subsamples of the data table, that the one or more columns include the information other than the target type of information with a confidence level above a threshold, where the second subsample may be obtained in response to determining that the confidence level may be above the threshold.

Some examples of the method, apparatus, and non-transitory computer-readable medium described herein may further include operations, features, means, or instructions for generating a second query to exclude the one or more columns in response to determining that the confidence level may be above the threshold, where the second query may be configured to obtain the second subsample.

In some examples of the method, apparatus, and non-transitory computer-readable medium described herein, additional first subsamples may be obtained and processed until the confidence level may be reached with respect to the one or more columns.

Some examples of the method, apparatus, and non-transitory computer-readable medium described herein may further include operations, features, means, or instructions for determining a sampling percentage that results in the first sample in accordance with a state of the data table and adjusting the sampling percentage in accordance with a result of processing the one or more first subsamples, the second subsample, or both.

In some examples of the method, apparatus, and non-transitory computer-readable medium described herein, the state of the data table includes a size of the data table, a population size of the data table, a distribution of data within the data table, or a combination thereof.

Some examples of the method, apparatus, and non-transitory computer-readable medium described herein may further include operations, features, means, or instructions for determining a subsampling percentage that results in a first subsample of the one or more first subsamples in accordance with a size of the data table or a sampling percentage for the first sample and adjusting the subsampling percentage in accordance with a result of processing the one or more first subsamples, the second subsample, or both.

In some examples of the method, apparatus, and non-transitory computer-readable medium described herein, adjusting the subsampling percentage may include operations, features, means, or instructions for increasing the subsampling percentage in accordance with a positivity rate of identifying the target type of information in the one or more first subsamples, the second subsample, or both.

In some examples of the method, apparatus, and non-transitory computer-readable medium described herein, obtaining the one or more first subsamples and the second subsample may include operations, features, means, or instructions for executing, to obtain a first subsample of the one or more first subsamples, a first query for a first set of multiple rows in the data table, the first set of multiple rows including the information from the first quantity of columns and executing, to obtain the second subsample, a second query for a second set of multiple rows in the data table, the second set of multiple rows including the information form the subset of columns, where the second query may be configured to exclude the one or more columns that include information other than the target type of information.

In some examples of the method, apparatus, and non-transitory computer-readable medium described herein, a first subsample may be obtained at a first time and the second subsample may be obtained at a second time and the first time and the second time may be based on production activity patterns within the data table, a predefined time interval, sample size for the first sample, a subsample size of the one or more first subsamples or the second subsample, or a combination thereof.

Some examples of the method, apparatus, and non-transitory computer-readable medium described herein may further include operations, features, means, or instructions for processing subsamples subsequent to the second subsample until satisfaction of a threshold percentage of the data table, until satisfaction of a confidence level with respect to identification of the target type of information in columns of the data table, or a combination thereof.

In some examples of the method, apparatus, and non-transitory computer-readable medium described herein, the target type of information includes sensitive information.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data management, comprising:
    executing a first query for a data table to obtain one or more first subsamples of a first sample of the data table, the one or more first subsamples comprising information from a first quantity of columns of the data table;
    processing the one or more first subsamples of the data table to identify whether the information included in the one or more first subsamples comprises a target type of information;
    executing a second query for the data table to obtain a second subsample of the first sample of the data table, the second subsample comprising information from a subset of columns of the first quantity of columns, wherein the second query is generated such that the subset excludes one or more columns of the first quantity that comprise information other than the target type of information;
    processing the second subsample of the data table to identify whether information included in the subset comprises the target type of information; and
    identifying, based at least in part on processing the one or more first subsamples and the second subsample, one or more locations of the target type of information within the data table.

2. The method of claim 1, further comprising:
    obtaining one or more additional subsamples of the first sample subsequent to obtaining the second subsample, wherein the one or more additional subsamples comprise information from a second subset of the subset of columns, wherein the second subset excludes one or more second columns of the subset that comprise information other than the target type of information.

3. The method of claim 1, further comprising:
    determining, based at least in part on processing the one or more first subsamples of the data table, that the one or more columns comprise the information other than the target type of information with a confidence level above a threshold, wherein the second subsample is obtained in response to determining that the confidence level is above the threshold.

4. The method of claim 3, further comprising:
    generating the second query to exclude the one or more columns in response to determining that the confidence level is above the threshold, wherein the second query is configured to obtain the second subsample.

5. The method of claim 3, wherein additional first subsamples are obtained and processed until the confidence level is reached with respect to the one or more columns.

6. The method of claim 1, further comprising:
    determining a sampling percentage that results in the first sample in accordance with a state of the data table; and
    adjusting the sampling percentage in accordance with a result of processing the one or more first subsamples, the second subsample, or both.

7. The method of claim 6, wherein the state of the data table comprises a size of the data table, a population size of the data table, a distribution of data within the data table, or a combination thereof.

8. The method of claim 1, further comprising:
  determining a subsampling percentage that results in a first subsample of the one or more first subsamples in accordance with a size of the data table or a sampling percentage for the first sample; and
  adjusting the subsampling percentage in accordance with a result of processing the one or more first subsamples, the second subsample, or both.

9. The method of claim 8, wherein adjusting the subsampling percentage comprises:
  increasing the subsampling percentage in accordance with a positivity rate of identifying the target type of information in the one or more first subsamples, the second subsample, or both.

10. The method of claim 1, wherein:
  a first subsample is obtained at a first time and the second subsample is obtained at a second time; and
  the first time and the second time are based at least in part on production activity patterns within the data table, a predefined time interval, sample size for the first sample, a subsample size of the one or more first subsamples or the second subsample, or a combination thereof.

11. The method of claim 1, further comprising:
  processing subsamples subsequent to the second subsample until satisfaction of a threshold percentage of the data table, until satisfaction of a confidence level with respect to identification of the target type of information in columns of the data table, or a combination thereof.

12. The method of claim 1, wherein the target type of information comprises sensitive information.

13. An apparatus for data management, comprising:
  one or more memories storing processor-executable code; and
  one or more processors coupled with the one or more memories and individually or collectively operable to execute the code to cause the apparatus to:
    execute a first query for a data table to obtain one or more first subsamples of a first sample of the data table, the one or more first subsamples comprising information from a first quantity of columns of the data table;
    process the one or more first subsamples of the data table to identify whether the information included in the one or more first subsamples comprises a target type of information;
    execute a second query for the data table to obtain a second subsample of the first sample of the data table, the second subsample comprising information from a subset of columns of the first quantity of columns, wherein the second query is generated such that the subset excludes one or more columns of the first quantity that comprise information other than the target type of information;
    process the second subsample of the data table to identify whether information included in the subset comprises the target type of information; and
    identify, based at least in part on processing the one or more first subsamples and the second subsample, one or more locations of the target type of information within the data table.

14. The apparatus of claim 13, wherein the one or more processors are individually or collectively further operable to execute the code to cause the apparatus to:
  obtain one or more additional subsamples of the first sample subsequent to obtaining the second subsample, wherein the one or more additional subsamples comprise information from a second subset of the subset of columns, wherein the second subset excludes one or more second columns of the subset that comprise information other than the target type of information.

15. The apparatus of claim 13, wherein the one or more processors are individually or collectively further operable to execute the code to cause the apparatus to:
  determine, based at least in part on processing the one or more first subsamples of the data table, that the one or more columns comprise the information other than the target type of information with a confidence level above a threshold, wherein the second subsample is obtained in response to determining that the confidence level is above the threshold.

16. The apparatus of claim 15, wherein the one or more processors are individually or collectively further operable to execute the code to cause the apparatus to:
  generate the second query to exclude the one or more columns in response to determining that the confidence level is above the threshold, wherein the second query is configured to obtain the second subsample.

17. A non-transitory computer-readable medium storing code for data management, the code comprising instructions executable by one or more processors to:
  execute a first query for a data table to obtain one or more first subsamples of a first sample of the data table, the one or more first subsamples comprising information from a first quantity of columns of the data table;
  process the one or more first subsamples of the data table to identify whether the information included in the one or more first subsamples comprises a target type of information;
  execute a second query for the data table to obtain a second subsample of the first sample of the data table, the second subsample comprising information from a subset of columns of the first quantity of columns, wherein the second query is generated such that the subset excludes one or more columns of the first quantity that comprise information other than the target type of information;
  process the second subsample of the data table to identify whether information included in the subset comprises the target type of information; and
  identify, based at least in part on processing the one or more first subsamples and the second subsample, one or more locations of the target type of information within the data table.

18. The non-transitory computer-readable medium of claim 17, wherein the instructions are further executable by the one or more processors to:
  obtain one or more additional subsamples of the first sample subsequent to obtaining the second subsample, wherein the one or more additional subsamples comprise information from a second subset of the subset of columns, wherein the second subset excludes one or more second columns of the subset that comprise information other than the target type of information.

19. The non-transitory computer-readable medium of claim 17, wherein the instructions are further executable by the one or more processors to:
  determine, based at least in part on processing the one or more first subsamples of the data table, that the one or more columns comprise the information other than the target type of information with a confidence level above a threshold, wherein the second subsample is obtained in response to determining that the confidence level is above the threshold.

* * * * *